April 21, 1959     F. G. MURILLO     2,882,668
LAWN-MAINTENANCE MACHINE
Filed Nov. 30, 1956     3 Sheets-Sheet 1
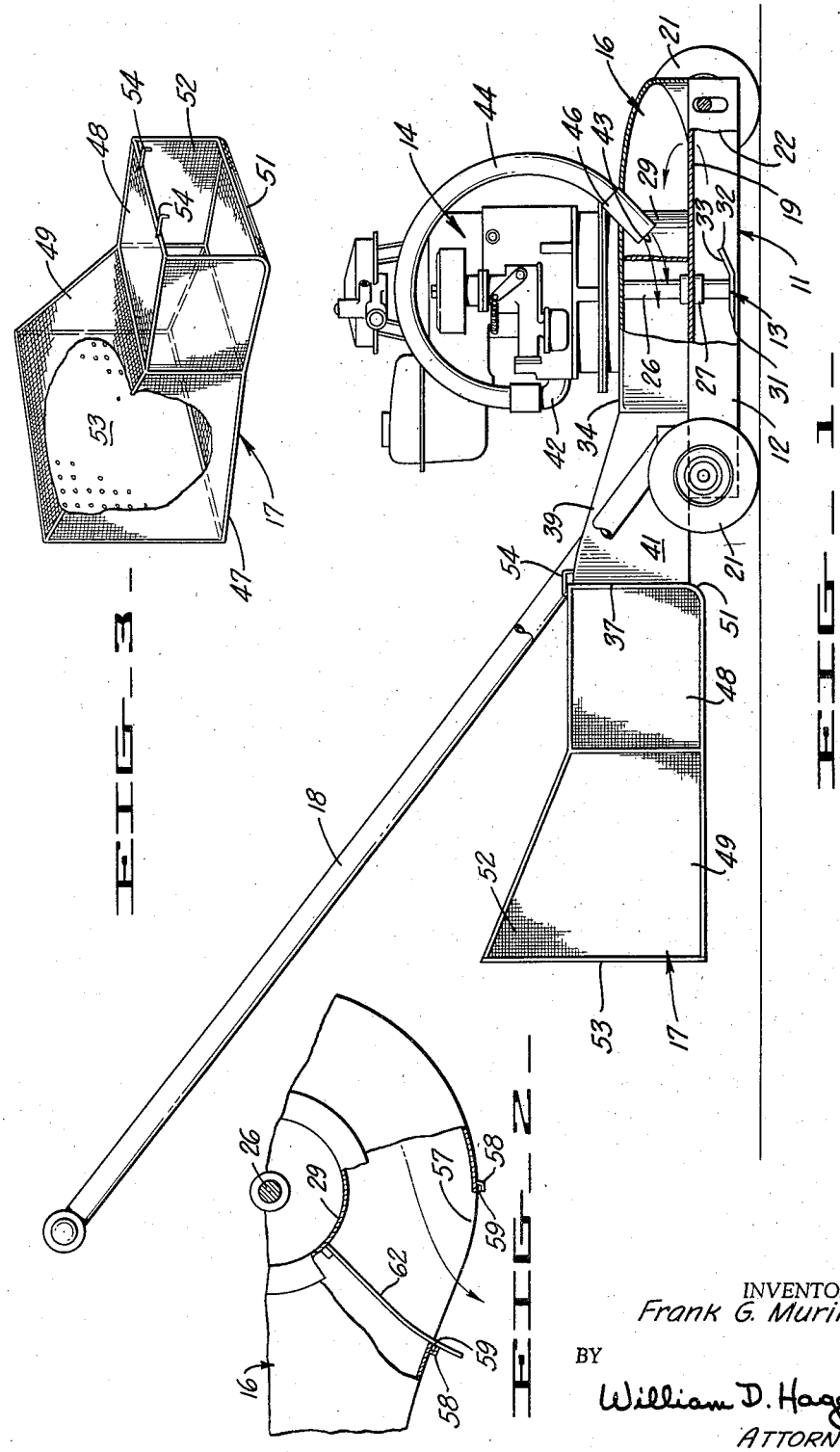
INVENTOR.
Frank G. Murillo
BY
William D. Hager
ATTORNEY April 21, 1959 — F. G. MURILLO — 2,882,668
LAWN-MAINTENANCE MACHINE
Filed Nov. 30, 1956 — 3 Sheets-Sheet 2

INVENTOR.
Frank G. Murillo
BY William D. Hager
ATTORNEY.

April 21, 1959     F. G. MURILLO     2,882,668
LAWN-MAINTENANCE MACHINE
Filed Nov. 30, 1956     3 Sheets-Sheet 3

INVENTOR.
Frank G. Murillo
BY William D. Hager
ATTORNEY.

_United States Patent Office_

2,882,668
Patented Apr. 21, 1959

2,882,668

LAWN-MAINTENANCE MACHINE

Frank G. Murillo, San Leandro, Calif.

Application November 30, 1956, Serial No. 625,308

2 Claims. (Cl. 56—25.4)

The present invention relates to lawn maintenance equipment in general, and more particularly to an improved rotary mowing machine.

One of the problems most frequently encountered in lawn maintenance is the disposal, after mowing, of the cut grass, fallen leaves from nearby trees and shrubs, scattered papers, and the like. While raking will rid the lawn area of the extraneous material, it often is a time consuming and tedious job.

Conventional rotary lawn mowers in general, unfortunately, have no provision for collecting the cut grass and other lawn cluttering extraneous material for the purpose of convenient disposal. Such lawn mowers return the cuttings to the lawn directly or, in some instances, pulverize the cuttings and throw same to the lawn laterally or to one side of the mower for purposes of mulching. The amount of cut grass and the like returned to the lawn is frequently of such large proportions, however, as to render the appearance of the lawn untidy, and in some instances is even so excessive as to be detrimental to lawn growth, thereby necessitating raking after mowing to remove the cut grass and other extraneous material.

Although the conventional rotary lawn mowers of previous mention which are adapted to throw lawn cuttings laterally of the mower may be modified to include means for attaching a grass catcher at the side of the mower in a position to receive the cuttings, such mowers are variously disadvantageous, in that the mower-catcher arrangements are generally awkward and clumsy. For example, since the grass catcher necessarily projects to one side of the mower, the closeness with which the mower may be directed to an edge of a lawn bounded by an upright obstacle, such as a hedge or wall, on the catcher side of the mower is limited. In such circumstances the mower can be directed in but one direction, i.e., the direction whereby the catcher is on the side of the mower opposite to the obstacle.

The present invention overcomes the foregoing inadequacies and disadvantages associated with conventional rotary lawn mowers by providing an improved lawn-maintenance machine which comprises in general a casing member attached to a mobile frame and having a downwardly extending opening. A cutting blade, rotatably mounted within the casing, is of a configuration to create an updraft of air therethrough for drawing cut material and the like upwardly into the casing during rotation. The updraft of air and material entrained thereby is then channeled away from the casing by means of a conduit communicating with the upper regions thereof and into a collector for subsequent disposal. The collector is advantageously attached to the frame within the compass thereof resulting in a very compact collector-mower arrangement. In addition, a closeable discharge vent is provided in the conduit in order that the cut material may be redistributed to the lawn for the purpose of mulching when desired.

Accordingly, it is an object of the present invention to provide an improved lawn-maintenance machine that may be propelled easily over the lawn to cut standing grass and which will pick up the cut grass as well as other extraneous material lying upon the lawn and either collect same for convenient disposal or discharge same to the lawn as a mulch, at the option of the operator.

It is another object of the present invention to provide an improved lawn-maintenance machine adapted to pick up cut grass and the like and transport same to a collector disposed within the compass of the machine in compact arrangement therewith.

A further object of the invention is to provide within a lawn maintenance machine a novel conduit including means for producing air currents therein upon which cut grass and the like may be entrained for delivery to a collector.

The present invention together with additional objects and advantages thereof will be better understood by reference to the following description taken in conjunction with the accompanying drawing wherein the invention is described and illustrated with respect to several preferred embodiments thereof. In the interest of clarity, however, no limitations are intended or to be implied therefrom, reference being made to the appended claims for a precise delineation of the scope of the invention.

In the accompanying drawing:

Figure 1 is a side elevational view of a lawn maintenance machine constructed in accordance with the present invention, with portions thereof broken away and shown in section.

Figure 2 is a fragmentary plan view of a portion of the machine with parts broken away and shown in section for illustrating a discharge vent and deflector plate structure.

Figure 3 is a perspective view with parts broken away of the grass collector portion of Figure 1.

Figure 4:
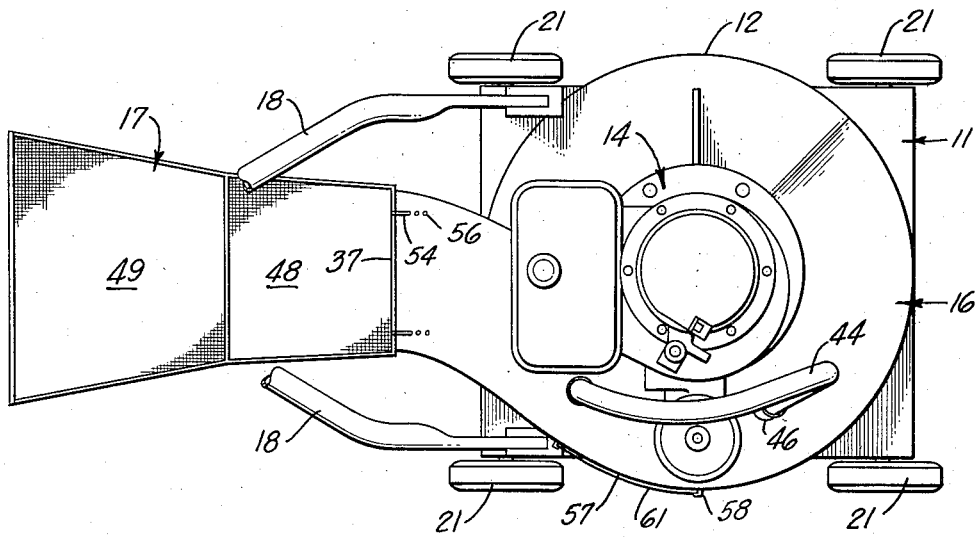
Figure 4 is a plan view of a portion of the machine of Figure 1.

Considering now the details of the illustrated embodiments of the invention and referring to various figures of the drawing there is delineated a lawn maintenance machine which comprises in general a mobile frame 11 adapted to be moved over a lawn, an open bottomed casing member 12 carried by frame 11, a generally horizontal cutting blade 13 rotatably mounted within casing 11 for cutting standing grass of the lawn and creating within such casing 11 an updraft of air upon which cut grass and the like is entrained, a prime mover 14 connected to blade 13 for rotating same, a conveyor conduit 16 communicating with the upper regions of casing 12 for channeling said updraft of air and cut grass entrained thereon away from the casing, and a collector 17 connected to conduit 16 for receiving and collecting the cut grass for convenient disposal.

More explicitly, as illustrated in Figure 1, there is provided a mobile frame 11 such as a wheeled carriage adapted to be pushed along the ground by means of an upwardly and rearwardly inclined handle 18, the lower portion of the handle being bifurcated and preferably hingedly connected at its ends to the frame 11.

The mobile frame proper conventionally comprises a horizontal rectangular platform 19 to which ground wheels 21 are rotatably secured at the front and rear extremities on either side thereof; such wheels being vertically adjustable to vary the clearance between platform 19 and the ground surface. A rigid rectangular metal shell 22 is attached to the lower side of platform 19 in circumferential relationship therewith or is formed as an integral downwardly extending skirt portion of platform 19. The lateral sides of shell 22 are each provided with a central elongated longitudinally extending slot or rectangular cut out region 23 to permit attachment of casing member 12 to platform 19 whereby the vertical edges of slots 23 appear as junctures of the shell and casing member.

Casing member 12 may be constructed in any suitable manner, for example as an open bottomed cylindrical shell rigidly attached to the lower surface of platform 19. It is to be noted that the diameter of cylindrical casing member 12 is substantially equal to the length of platform 19 such that the forward and rearward sides of rectangular shell 22 contact downwardly extending vertical wall 24 of the cylindrical casing tangentially and the vertical sides of slots 23 coincide intimately with portions of such wall 24 extending arcuately through the slots laterally of platform 19. The vertical dimension of wall 24 is such that the open end of casing 12 is in close proximity with the ground surface.

Cutting blade 13 is mounted for rotation about a central vertical axis within casing 12 preferably by means of an elongated vertical drive shaft 26 rigidly attached at one end to the center of said blade. Shaft 26 is rotatably mounted within casing 12 as by extending the shaft upwardly through a bearing collar 27 which is rigidly secured within a central vertical bore, not shown, through the upper wall of the casing and platform 19. The end of shaft 26 projecting upwardly from collar 27 is rigidly connected to the drive shaft of the aforementioned prime mover 14, which may be for example, a small internal combustion engine or electric motor, carried by platform 19. Prime mover 14 is best mounted in central vertically spaced relationship above platform 19 and to accomplish the foregoing a hollow cylindrical motor mount 29 adapted to support the prime mover is centrally secured to the top surface of platform 19 concentric with shaft 26.

It will be appreciated that with prime mover 14 supported by motor mount 29 and connected to shaft 26 as described above, the length of such shaft is chosen such that the horizontal plane of rotation of cutting blade 13 is in close proximity to the ground surface whereby the edges of said cutting blade will contact standing grass at points near the ground surface.

It is to be noted that cutting blade 13 may be of any suitable configuration for cutting grass as well as creating updrafts of air or upwardly spiralling air currents within casing 12. Such updrafts of air are effective in urging bent over blades of grass to upright positions for efficient and neat cutting action by the rotating blade 13 and in addition provide a medium upon which the cut grass and other material extraneous to the lawn will be entrained and thereby drawn upwardly within casing 12.

In the various embodiments of the invention herein described and illustrated, cutting blade 13 is formed as an elongated rectangular strip centrally attached to shaft 26 and having a length slightly less than the diameter of casing 12. Leading edges 31 of the blade 13 are sharpened for cutting grass while trailing edges 32 are upwardly pitched, or more preferably, include upwardly inclined segments 33 at the ends thereof for creating the aforesaid updraft of air.

The conveyor conduit 16, of previous mention for channeling the updraft of air and cut material entrained thereon away from casing 12, is mounted upon the upper surface of platform 19 to overlie casing 12. Overlie is herein defined, as affects the present invention, as meaning to lie over in whole or in part, i.e., conduit 16 may lie either wholly or partially over casing 12.

Communication between casing 12 and conduit 16 is provided as by means of a duct 34 extending through the upper wall surface of casing 12 and platform 19. Duct 34 is preferably formed in the forward half of platform 19 as an elongated rectangular opening radially extending between a point proximate to the circumference of motor mount 29 and a point near the circumference of casing 12. Radial edge 36 of duct 34 at the leading end thereof relative to the direction of rotation of blade 13 is formed as a downwardly inclined lip in order that cut material transmitted by the duct will not accumulate within conduit 16 and thereby minimize the efficiency with which such cut material is channeled away from casing 12.

Considering now the preferred structure for providing conveyor conduit 16, it is to be noted that such conduit is formed generally as an upwardly spiralling, rearwardly extending receptacle or shroud of substantially uniform width and varying rectangular cross section enclosing a region above platform 19 in communication with duct 34 and bounded in part by the circumference of motor mount 29 and the circumference of casing 12. Conduit 16 extends from a position on platform 19 displaced substantially 90° of arc from edge 36 of said duct in an angular direction opposite to the direction of rotation of blade 13, to a terminal transverse opening 37 centrally rearward of the trailing edge of platform 19.

Figure 5:
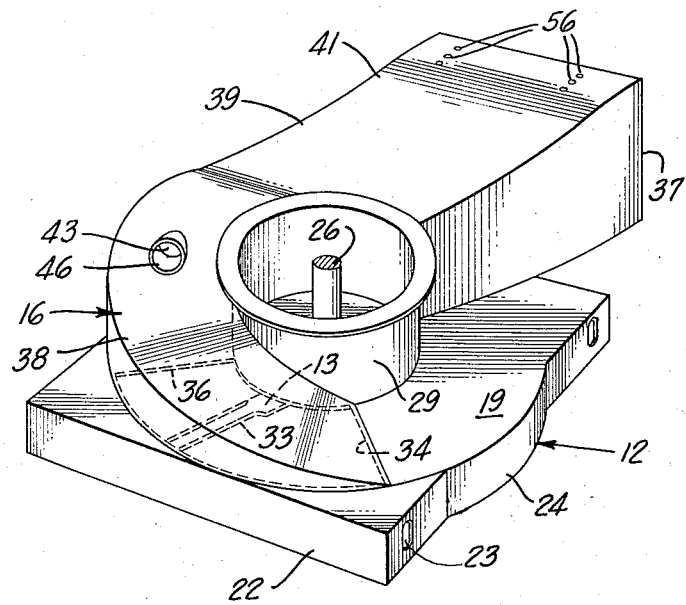
Figure 5 is a perspective detail view of a conveyor conduit structure of the present invention.

To facilitate fabrication of conduit 16, a section of sheet metal is first cut to a suitable configuration and then appropriately bent to form a structure which when mounted coacts with the upper surface of platform 19 and the periphery of motor mount 29 to form the conduit 16 of spiral configuration as illustrated in particular detail in Figure 5 of the drawings. More particularly, the aforementioned section of sheet metal is bent to establish an inverted L-shaped cross-section in a first section 38 of conduit 16 adapted for mounting upon the upper surface of platform 19 in the region thereof bounded by the periphery of motor mount 29 and the circumference of casing 12 with such inverted L-shaped cross-section then forming the exterior side and top of the conduit and the periphery of motor mount 29 and the upper surface of platform 19 respectively forming the interior side and bottom thereof. Similarly, the section of sheet metal is formed in cross-section as an inverted U to provide the sides and top of a second section 39 of conduit 16 adapted to develop from mount 29 and extend rearwardly to the rear edge of platform 19, the top surface of platform 19 thus forming the bottom of the conduit in this section. Finally, a third section 41 of conduit 16 extending rearwardly of platform 19 is formed by bending the corresponding portion of the aforesaid piece of sheet metal in accordance with a cross-section describing a closed rectangle forming the sides, top, and bottom of the conduit section 41.

Conduit 16 is rigidly attached to platform 19 by securing the surfaces of the sheet metal structure forming the conduit to the upper surface of the platform and the periphery of motor mount 29.

In order that cut grass and the like transmitted through duct 34 from casing 12 be efficiently channeled through conduit 16, means are provided therein to establish strong air currents therethrough in a generally rearward direction. Preferred structure for accomplishing the foregoing as employed in one embodiment of the lawn maintenance machine of the present invention is illustrated in Figures 1, 4, and 5 of the drawings. As shown therein, prime mover 14 comprises an internal combustion engine including exhaust structure 42 for expending the gaseous material conventionally evolved during engine operation. The salient features of the illustrated embodiment reside in the provision of an inlet orifice 43 in conduit 16 and means for connecting exhaust structure 42 to said orifice 43, which means preferably comprises a length of flexible tubing 44 connected at one end to the exhaust structure and at the other end to a feed through bushing 46 secured within orifice 43 and projecting exteriorly of conduit 16 to form a collar for facilitating attachment of the tubing as by a forced fit, clamping, or the like.

Orifice 43 may be provided at any point in conduit 16 near duct 34 and is directed generally rearward toward conduit terminal opening 37, although such orifice is preferably provided at a point in the top surface of conduit 16 which is opposite duct 34 and displaced slightly rearward thereof. The gaseous material evolved by prime mover 14 is thus channeled rearwardly through conduit 16 proximal duct 34 and out of terminal opening 37, the movement of such gaseous material through conduit 16 creating correspondingly directed air currents upon which the cut material and the like emanating from duct 34 will be entrained and thereby conveyed through conduit 16 for ejection from terminal opening 37.

The grass collector 17 of previous mention connected to conduit 16 for collecting the cut grass and the like therefrom for convenient disposal is of any suitable grass intercepting configuration which may be carried by mobile frame 11 and adapted for communicable attachment to conduit terminal opening 37 while being pervious to the air currents exhausted therefrom. Grass collector 17 is preferably constructed, however (see Figure 3), as a framed structure 47 having a front section 48 of substantially constant rectangular cross-section slightly greater than the cross-section of conduit terminal opening 37, and an enlarged rear section 49 the sides and top of which are rearwardly and outwardly flared and upwardly inclined from front section 48. In addition, the bottom surface of front section 48 includes a short downwardly tapered region 51 at the front edge of structure 47 for purposes to be subsequently described.

The top, bottom, and sides of framed structure 47 are covered with suitable screen 52 while the rear end of such structure is closed by a perforated safety plate 53 rigidly attached thereto and the front end of the structure is left open to facilitate communication between the grass collector 17 so formed and conduit 16. Mounting hooks 54 are secured to the top of collector 17 at each side of the front edge thereof, which hooks are adapted to engage pairs of transversely spaced holes 56 provided in the top of conduit section 41 near terminal opening 37 for the purpose of detachably connecting collector 17 to conduit 16. With hooks 54 engaging holes 56 the open front end of collector 17 encompasses the rear end extremity of conduit section 41 such that terminal opening 37 extends partially within collector front section 48. Cut grass and the like expelled from conduit opening 37 as mobile frame 11 is moved over a lawn is consequently intercepted and collected by collector 17. It will be noted that as hooks 54 engage pairs of holes 56 of greater longitudinal displacement from the end extremity of conduit section 41, the clearance between collector 17 and the ground surface correspondingly increases. Collector 17 may thus be appropriately adjusted to accommodate adjustment of wheels 21 to vary the vertical clearance of platform 19 above the ground surface.

In some instances it is desirable that the cut grass normally collected by collector 17 be redistributed to the lawn for mulching and the like, and preferred structure for selectively facilitating same is shown in detail in Figure 2 of the drawings. As shown therein, a closeable vent 57 or door is provided in conduit 16 which vent is preferably formed as a rectangular opening in the exterior side of the conduit at a point rearward of duct 34 and substantially tangentially opposite same. Vertical guide brackets 58 are attached to conduit 16 adjacent the vertical edges of vent 57 to form with the exterior side of said conduit vertical slots 59 for slideably engaging a closure plate 61 (see Figure 4).

In order that the air currents and cut material entrained thereon directed rearwardly through conduit 16 be efficiently diverted through vent and laterally of mobile frame 11 for the purpose of mulching when closure plate 61 is removed, a removable deflector plate 62 is inserted through the vent adjacent the rear edge thereof and, when fully engaged, contacts the periphery of motor mount 29 in closing relationship with conduit 16 as illustrated in Figure 2. It will be appreciated that the dimensions of conduit 16, discharge vent 57, and closure plate 61 may be chosen such that the closure plate may be additionally employed as deflector plate 62.

Figure 6:
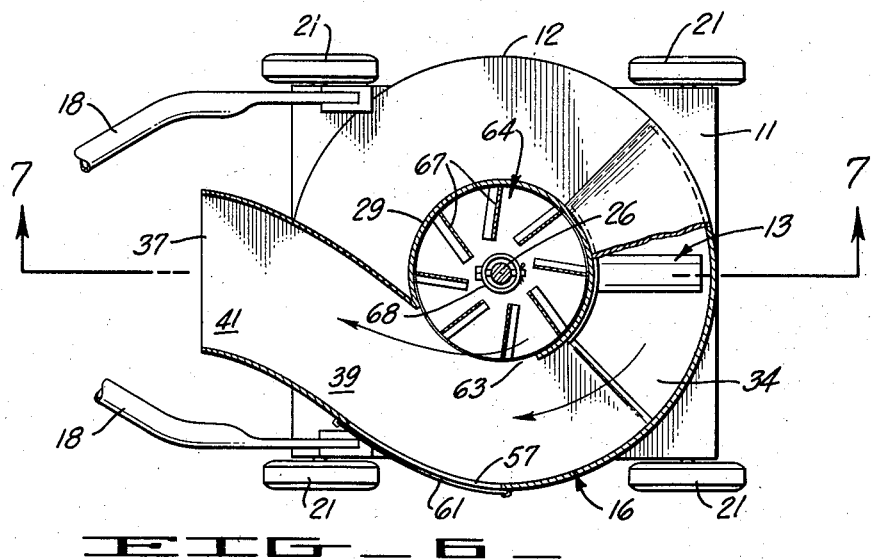
Figure 6 is a plan view of a modified embodiment of the present invention, with portions thereof broken away and shown in section.
Figure 7:
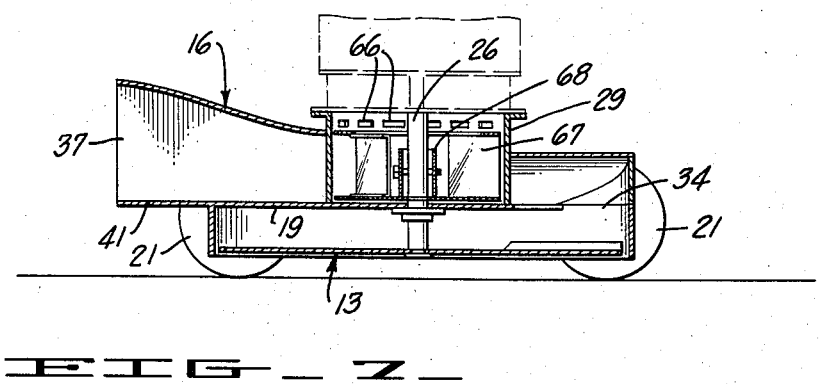
Figure 7 is a longitudinal sectional view taken substantially on the plane of line 7—7 of Figure 6.

Considering now a second embodiment of the lawn maintenance machine of the present invention the salient features of which embodiment reside in a modified conduit 16 incorporating diverse structure for establishing the strong air currents of previous mention rearwardly through the conduit as illustrated in Figures 6 and 7 of the drawing, it is to be noted that in this embodiment the orifice 43 and means for connecting same to exhaust structure 42 of prime mover 14 are dispensed with. Moreover, prime mover 14 is not necessarily an internal combustion engine including exhaust structure in the instant embodiment but may as well be an electric motor or any other suitable means for imparting angular rotation to drive shaft 26. In addition, communication is established between conduit 16 and the interior regions of motor mount 29 by means of a rectangular opening 63 in the periphery thereof, the region enclosed by the motor mount thereby forming an integral part of the conduit. Rectangular opening 63 preferably extends circumferentially along the periphery of motor mount 29 from a point displaced slightly to the rear of duct 34 to the juncture of motor mount 29 with conduit section 39 and extends vertically from a point spaced above the upper surface of platform 19 to a point spaced below the top of conduit 16.

Structure for establishing strong air currents rearwardly of the modified conduit 16 described above preferably comprises an impeller 64 rotatably mounted within the interior of motor mount 29 and rigidly connected to drive shaft 26 extending therethrough, while motor mount 29 is centrifugally perforated at its upper extremity as shown generally at 66 to permit intake of air. Impeller 64 may be of any suitable configuration for directing air sucked into motor mount 29 through perforations 66 out of opening 63 and generally rearward through conduit 16. Impeller 64 is preferably formed, however, as a plurality of vertical vanes 67 secured in circumferentially spaced relationship to a generally cylindrical spider 68 having external dimensions slightly less than the internal dimensions of motor mount 29 and adapted for coaxial rigid attachment to drive shaft 26; such vanes 67 being pitched in the direction of angular rotation of shaft 26. Impeller 64 thus provides means within conduit 16 for establishing strong rearwardly directed air currents upon which cut grass and the like emanating from duct 34 will be entrained and thereby either conveyed through conduit 16 and collected by collector 17 with discharge vent 57 closed or discharged laterally of mobile frame 11 through said vent 57 with same open and deflector 62 engaged.

Considering now the operation of the lawn maintenance machine of the present invention as illustrated in the drawings and hereinbefore described with respect to several preferred embodiments thereof, prime mover 14 is first energized to impart rotary motion through drive shaft 26 to horizontal cutting blade 13 and mobile frame 11 is propelled over the lawn surface as by an operator exerting force on handle 18. The sharpened edges 31, of the rotating blade 13, cut grass which is urged to an upright position in casing 12 by the updraft of air created therein due to the rotary motion of pitched blade edges 32. Leaves, scattered papers, and other material extraneous to the lawn surface are also entrained on the updraft of air and are sucked upwardly into casing 12 and into the plane of cutting blade 13, such material being thereby pulverized in encountering sharpened cutting edges 31. The updraft of air and cut material entrained thereon is then channeled through duct 34 into conduit 16.

The cut material as received in conduit 16 is entrained on rearwardly directed air currents created therein, which air currents convey the cut material through the conduit and out of terminal opening 37 into collector 17. When such collector becomes filled with cut material, the cut material may be conveniently disposed of by detaching the collector from conduit section 41 and dumping the cut material therefrom at a suitably remote location.

In the case of the embodiment of the invention illustrated in Figures 1, 4, and 5, the above mentioned rearwardly directed air currents created in conduit 16 are effected by the gaseous exhaust material expelled by prime mover 17 and introduced to the conduit through orifice 43. The conduit in effect operates as an extension to prime mover exhaust structure 42 whereby conduit terminal opening 37 serves as an outlet for the prime mover exhaust material. Such exhaust material in being channeled rearwardly through conduit 16 is effective in producing correspondingly directed air currents.

In the case of the embodiment illustrated in Figures 6 and 7, the rotary motion imparted to impeller 64 by drive shaft 26 forces air through opening 63 toward conduit terminal opening 37 to thereby create air currents rearwardly through conduit 16.

With regard to collector safety plate 53, it will be appreciated that in either of the hereinbefore described embodiments of the invention, rocks and other solid objects may be drawn into casing 12 from the lawn surface and subsequently propelled with substantial force rearwardly from conduit terminal opening 37 into collector 17. Consequently safety plate 53 is fabricated as a sturdy plate including perforations of small diameter to insure interception of solid objects which might otherwise injure the operator as he pushes the lawn maintenance machine from a position directly behind the collector.

An advantageous feature in the operation of the lawn maintenance machine of the present invention results from the incorporation of inclined section 51 in collector 17. Normally, cut material would tend to accumulate near the front of the collector, however such accumulation is greatly minimized by inclined section 51 of collector 17 since mechanical vibrations imparted to mobile frame 11 from prime mover 14 shake any accumulation of the cut material down the inclined section into the collector.

In the event it is desired to redistribute cut material to the lawn for mulching and the like, closure plate 61 is removed and deflector plate 62 is inserted into discharge vent 57 as hereinbefore described. The rearwardly directed air currents created in conduit 16 of either of the embodiments hereinbefore described is thus blocked from conduit terminal opening 37 and diverted through vent 57 by deflector plate 62. The cut material entrained on such air currents is consequently spewed laterally of mobile frame 11 from vent 57 and thereby redistributed to the lawn without interfering with the operator.

While the salient features of this invention have been described in detail with respect to certain embodiments thereof, it will of course be apparent that certain modifications may be made within the spirit and scope of this invention, and it is not desired therefore to limit the invention to the exact details shown except insofar as they may be defined in the following claims.

What is claimed is:

1. A lawn maintenance machine comprising a mobile frame adapted to be guided over a lawn surface, a casing carried by said frame and formed with a downwardly extending opening, the upper end of said casing having a circumferentially elongated open duct through the forward half thereof in radially spaced relation with the center of the casing, said duct having a downwardly inclined rear radial edge surface, a cutting blade mounted for rotation about a vertical axis centrally of said casing, said blade constructed to create upon rotation an updraft of air within said casing and through said duct whereby cut material will be entrained upon said updraft of air for passage through said duct, a conveyor conduit overlying said casing in communication with said duct for receiving said updraft of air and material entrained thereon passing through said duct, said conduit spiralling upwardly from said duct and extending rearwardly of said frame, said conduit having a rearwardly directed inlet orifice proximate said duct, a collector connected in communication with said conduit and disposed rearwardly of said mobile frame, an internal combustion engine including exhaust structure for evolving expended fuel gases carried by said frame and connected to said blade for effecting said rotation, and means connecting the exhaust structure of said engine to said orifice with said expended fuel gases being channeled at high velocity therethrough to establish strong air currents directed rearwardly through said conduit, said cut material being entrained upon said strong air currents for efficient passage through the conduit and delivery to the collector.

2. A lawn maintenance machine comprising a wheeled frame, a cylindrical casing attached to the lower surface of said frame and having a circumferentially elongated open duct formed in the upper end thereof and an open bottom disposed adjacent the ground surface, said duct disposed in the forward half of said casing in radially spaced relation with the center thereof, said duct having a downwardly inclined rear radial edge surface, a vertical drive shaft having a lower end portion disposed centrally of said casing and an upper end portion extending upwardly through said frame and projecting from the top surface thereof, a horizontal cutting blade secured to the lower end portion of said shaft within said casing, said blade having sharp leading edges for cutting grass and pitched trailing edges for generating when rotated an updraft of air within said casing and through said duct, a motor mount attached to the top surface of said frame concentric with the upper end portion of said shaft, an internal combustion engine secured upon said mount and connected to said shaft for rotating same, said engine including exhaust structure for evolving expended fuel gases, an upwardly spiralling rearwardly extending conduit attached to the top surface of said frame and communicating with said duct, said conduit formed with a rearwardly directed inlet orifice proximate said duct, a length of flexible tubing connecting the exhaust structure of said engine to said orifice with said expended fuel gases being channelled at high velocity therethrough to establish strong air currents directed rearwardly through said conduit, said cut material being entrained upon said strong air currents for efficient rearward passage through said conduit, and a hollow enclosed collector pervious to air currents detachably connected to the rear of said frame, said collector having a front opening communicating with the rear of said conduit to receive said cut material, said front opening having a lower front edge section tapered downwardly from said conduit with mechanical vibrations imparted to said frame from said engine shaking cut material accumulated at said opening down said inclined section into said collector.

References Cited in the file of this patent

UNITED STATES PATENTS

| | | |
|---|---|---|
| 2,539,779 | Grosso | Jan. 30, 1951 |
| 2,719,396 | Morris et al. | Oct. 4, 1955 |
| 2,777,270 | Colclazier | Jan. 15, 1957 |